Figure 1:
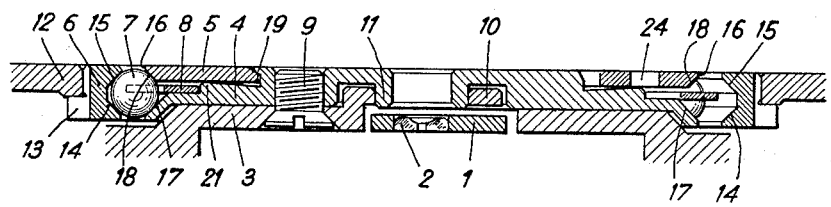

Aug. 17, 1965  H. STAMM  3,201,185

BALL BEARING

Filed Oct. 3, 1963

Inventor
Heinrich Stamm
By Stevens, Davis, Miller & Mosher
Attorneys

United States Patent Office 3,201,185
Patented Aug. 17, 1965

3,201,185
BALL BEARING
Heinrich Stamm, Grenchen, Switzerland, assignor to ETA A.G. Ebauches-Fabrik, Grenchen, Switzerland, a company limited
Filed Oct. 3, 1963, Ser. No. 313,621
4 Claims. (Cl. 308—196)

This invention relates to ball bearings and in particular to those used in selfwinding watches for journalling the winding weight thereof.

It is an object of this invention to provide a ball bearing of reduced thickness.

Another object of the invention consists in providing a ball bearing in which the free play of the balls within their race can be adjusted easily and quickly when assembling the bearing as well as when entertaining the watch in service.

With the ball bearing improved according to the invention the ball race has one half of its wall extending in part on a rigid body member and in part along one of the edges of an annular flat spring blade secured to the rigid body member by which this spring blade is gripped along the other one of its edges as well as at places located between its edges, the rigid body member thereby exerting pressures in opposed directions on the spring blade thus clamping the same.

Further more particular objects of the invention will still become apparent in the course of the following description.

One embodiment of the ball bearing improved according to the invention is represented diagrammatically and by way of example in the accompanying drawings.

Figure 2:
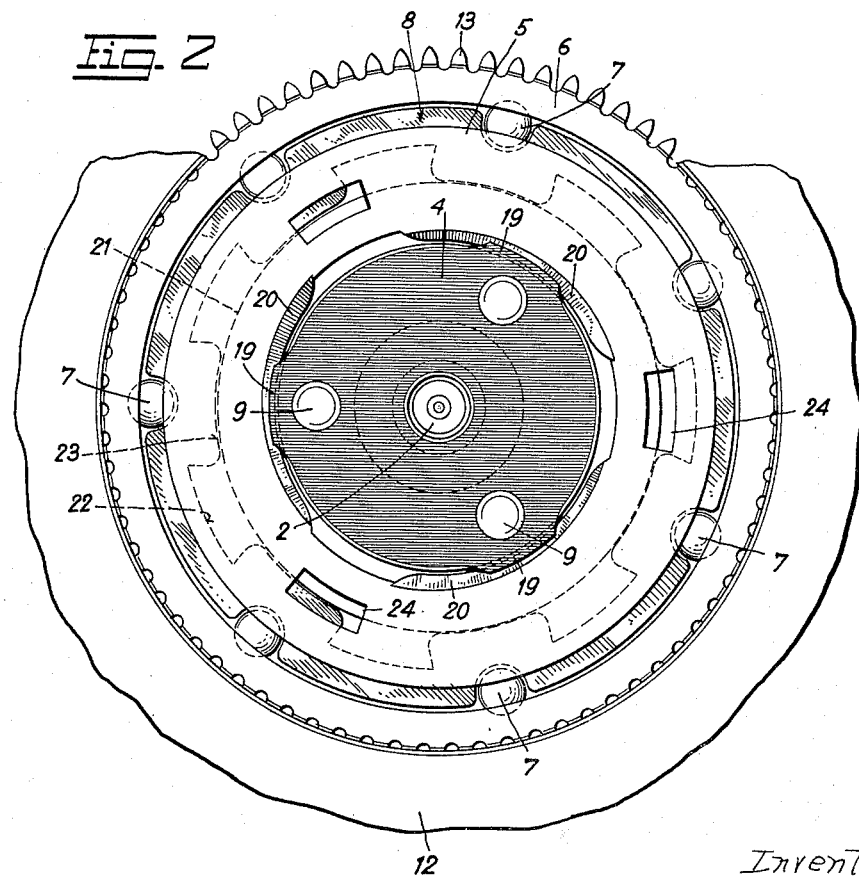

In the drawings:

FIG. 1 is a sectional view of the bearing, and
FIG. 2 is a plane view thereof.

The ball bearing represented in the drawings serves to journal the winding weight of a selfwinding watch. It is carried by a frame part 3 and it extends above a wheel bridge 1 carrying the upper bearing 2 of a sweep second wheel. The bearing represented is moreover coaxial to bearing 2. The frame part 3 carrying this bearing forms part of the selfwinding mechanism of the watch and it is rigidly secured to the framework thereof by means which do not form part of this invention and which have therefore not been shown in the drawings.

The bearing represented comprises a rigid body member 4, an annular flat spring blade 5, an outer ring 6, balls 7 and a ball cage 8 holding the balls 7 at predetermined distances from each other within their race. The body member 4 is rigidly secured to the frame part 3 by means of three screws 9. It is held in a precise centered position by means of a cylindrical projection 11 adjusted in an eyelet 10 of part 3. The outer ring 6 has one half set with force fit in a middle opening of the hub portion 12 of the winding weight. The part of ring 6 protruding from the hub portion 12 and extending between frame part 3 and hub portion 12 is provided with an outer toothing 13 by means of which the rotary displacements of the winding weight are transmitted to the selfwinding mechanism of the watch (not shown) in a manner well known to those skilled in the art.

While the outer half of the ball race wall consists of two truncated conical surfaces 14 and 15 of the same piece, the inner half of the ball race wall extends in part on the body member 4 of the bearing and in part along the outer edge 16 of spring blade 15. This inner ball race wall, however, also consists of two truncated conical surfaces 17, 18 facing each other and provided on body member 4 and spring blade 5, respectively.

Spring blade 5 is removably and adjustably secured to body member 4. For this purpose body member 4 is provided, on the one hand, with three outer radial projections 19 having truncated conical lower surface portions engaging three helical surface portions 20 of spring blade 5 extending along the inner edge thereof, and, on the other hand, with an annular projection 21 formed by a cylindrical surface and a slightly inclined surface extending approximately over the inner half of the free annular space of body member 4 provided between projections 19 and surface portion 17 of the ball race wall. To form projections 19, one can first provide the body member 4 with a cylindrical projection in its middle portion and then form an undercut truncated conical surface around this projection. Finally, the undercut portion of body member 4 can be milled or cut away by stamping at some places of its periphery. The forces or pressures exerted, on the one hand, by projection 21 on one side surface of spring blade 5 approximately along the middle line thereof extending between the edges of this spring blade, and which are directed upwards in FIG. 1, and, on the other hand, by the radial projections 19 on the inner edge of spring blade 5, and which are directed downwards in FIG. 1, produce a clamping action on spring blade 5, thus securing the same to body member 4. This clamping action can be modified by rotating spring blade 5 coaxially to the bearing to a more or less great extent. Upon turning spring blade 5 clockwise in FIG. 2, the clamping action increases, since projections 19 engaging the helical surface portions 20 urge more and more the inner edge of spring blade 5 downwards in FIG. 1. Due to the deformation of spring blade 5 produced by the above mentioned rotation thereof, the surface portion 18 moves away from surface portion 17 when the clamping action of spring blade 5 increases, so that the free play of ball 7 also becomes greater and greater, when spring blade 5 is rotated clockwise in FIG. 2. In other words the free play of balls 7 can easily be adjusted by merely rotating spring blade 5 coaxially to the bearing. The sizes of body member 4 and of spring blade 5 are advantageously chosen so that balls 7 are certainly clamped between surface portions 14, 15 and 17, 18 when the helical surface portions 20 of spring blade 5 are just engaged under projections 19. In order that projections 19 come in the positions represented in FIG. 2 after the free play of balls 7 has been adjusted, said projections lying then each on the middle portion of the corresponding helical portion 20, spring blade 5 is preferably bulged in a direction opposed to that in which projections 19 and 21 of the body member tend to deform the same. Due to its bulged shape, member 5 can easily be mounted on body member 4, because projection 21 thereof does only oppose a small resistance to the engagement of the helical surface portions 20 under the radial projections 19. The spring blade 5 still serves as cover member for the bearing, thus not only retaining the balls 7 therein, but also their cage 8. The ball cage 8 comprises several sections 22, 23, which extend either outwards between the balls or inwards opposite the same. The inner sections 23 of the ball cage 8 constitute bearing elements for the cage by cooperating for that purpose with the cylindrical surface portion of body member 4 belonging to the annular projection 21 thereof.

The spring blade 5 is finally provided with three rectangular openings 24 permitting, on the one hand, this spring blade to be rotated by means of an appropriate tool or even of a tweezers, and on the other hand, the passages of sections 23 of cage 8 to be observed thus permitting the correct operation of the bearing to be checked.

Instead of the arrangement described, the outer half of the ball race wall could be arranged on two different pieces removably and adjustably secured to each other and the inner half of the ball race wall be provided on one and the same piece. In such a modification one of the two outer pieces of the bearing would be rigid and act on helical surface portions provided along the outer edge of an annular flat spring blade by means of inner radial projections, the lower surfaces of which would be truncated conical.

The bearing improved according to the invention has the main advantage to comprise a central portion having an extremely reduced height, which can even be made smaller than the ball diameter. A watch movement provided with a selfwinding mechanism comprising a bearing according to the invention is therefore only slightly thicker than the same movement without selfwinding mechanism. The central portion of the bearing is moreover provided with an opening giving access to the upper bearing of the sweep second wheel, so that the latter can for instance be lubricated without necessitating the selfwinding mechanism to be disassembled. Finally, the free play of the bearing balls can easily be adjusted either by the manufacturer, when assembling the bearing, or by any watchmaker, to whom the watch is submitted for repair or for any other service after sale.

Although one embodiment and a modification of my invention have been extensively disclosed heretofore with reference to the accompanying drawings, it should be understood that still further changes in the shape, sizes and arrangement of parts will appear obvious to those skilled in the art within the scope of the appended claims.

I claim:

1. In a ball bearing having a race for the balls, in combination, a rigid body member carrying a section of the ball race wall, an annular flat spring blade having two side surfaces and two edges and carrying another section of the ball race wall along one of its edges, and projections on said body member exerting pressures, on the one hand, on one of said side surfaces of said spring blade in the vicinity of the other one of the edges thereof, and, on the other hand, on the other one of said side surfaces on a portion thereof extending between said edges, thus retaining said spring blade on said body member by clamping.

2. A ball bearing according to claim 1, the spring blade and the projections of the body member exerting pressure thereon in the vicinity of the other one of the edges thereof engaging each other along helical surface portions.

3. A ball bearing according to claim 2, the annular flat spring blade being bulged in a direction opposed to that in which the clamping action of the projections of said body member tend to deform the same.

4. In a ball bearing having a race for the balls, in combination, a rigid body member carrying a section of the ball race wall, an annular flat spring blade having two side surfaces and two edges and carrying another section of the ball race wall along one of its edges, a ball cage retaining the balls of the bearing at predetermined distances from each other within their race, radial projections on said body member exerting pressures on one of the side surfaces of said spring blade in the vicinity of the other one of the edges thereof, and an annular projection on said body member having an outer substantially cylindrical surface portion journalling said ball cage, said annular projection exerting pressures on the other one of the side surfaces of said spring blade on a portion thereof extending between said edges, said projections of the body member thereby retaining said spring blade thereon by clamping.

References Cited by the Examiner
UNITED STATES PATENTS

| | | | |
|---|---|---|---|
| 883,393 | 3/08 | Edlund | 308—189 X |
| 1,242,582 | 10/17 | Needham | 308—189 |
| 2,686,397 | 8/54 | Annen | 308—196 X |
| 2,948,573 | 8/60 | Stamm | 308—197 |

DON A. WAITE, *Primary Examiner.*

ROBERT C. RIORDON, *Examiner.*